United States Patent
Chuo et al.

(10) Patent No.: US 9,292,689 B1
(45) Date of Patent: Mar. 22, 2016

(54) INTERACTIVE MALICIOUS CODE DETECTION OVER A COMPUTER NETWORK

(75) Inventors: Tsun-Sheng Chuo, San Gabriel, CA (US); Chih-Kun Ho, Taipei (TW); Ming-Hui Teng, Taipei (TW); Ren-Chien Chou, Taipei (TW); Chen-Wei Hsiao, Taipei (TW); Sung-Ching Lin, Pasadena, CA (US); Chiu-Ming Wang, Temple City, CA (US)

(73) Assignee: Trend Micro Incorporated, Tokyo (JP)

( * ) Notice: Subject to any disclaimer, the term of this patent is extended or adjusted under 35 U.S.C. 154(b) by 2278 days.

(21) Appl. No.: 12/250,781

(22) Filed: Oct. 14, 2008

(51) Int. Cl.
*G06F 11/00* (2006.01)
*G06F 21/56* (2013.01)
*H04L 29/06* (2006.01)

(52) U.S. Cl.
CPC ............ *G06F 21/562* (2013.01); *H04L 63/145* (2013.01)

(58) Field of Classification Search
USPC .......................................................... 726/22
See application file for complete search history.

(56) References Cited

U.S. PATENT DOCUMENTS

| | | | |
|---|---|---|---|
| 5,623,600 A | 4/1997 | Ji et al. | |
| 6,021,510 A | 2/2000 | Nachenberg | |
| 6,094,731 A * | 7/2000 | Waldin et al. | 714/38.14 |
| 6,195,587 B1 | 2/2001 | Hruska et al. | |
| 6,212,525 B1 * | 4/2001 | Guha | 707/747 |
| 6,745,192 B1 | 6/2004 | Libenzi | |
| 6,748,538 B1 | 6/2004 | Chan et al. | |
| 6,847,995 B1 | 1/2005 | Hubbard et al. | |
| 6,938,097 B1 | 8/2005 | Vincent et al. | |
| 7,010,807 B1 | 3/2006 | Yanovsky et al. | |
| 7,096,493 B1 | 8/2006 | Liu | |
| 7,099,853 B1 | 8/2006 | Liu et al. | |
| 7,143,113 B2 | 11/2006 | Radatti | |
| 7,185,015 B2 | 2/2007 | Kester et al. | |
| 7,203,959 B2 | 4/2007 | Nachenberg et al. | |
| 7,299,277 B1 | 11/2007 | Moran et al. | |
| 7,328,349 B2 | 2/2008 | Milliken | |
| 7,337,471 B2 | 2/2008 | Nachenberg et al. | |
| 7,367,056 B1 * | 4/2008 | Szor et al. | 726/24 |
| 7,373,643 B2 | 5/2008 | Radatti | |
| 7,406,454 B1 | 7/2008 | Liu et al. | |
| 7,458,099 B1 * | 11/2008 | Nachenberg et al. | 726/24 |
| 7,861,296 B2 * | 12/2010 | Costea et al. | 726/22 |

(Continued)

OTHER PUBLICATIONS

Binary diff/patch utility, 1 sheet [retrieved on May 30, 2008]. Retrieved from the Internet: http://www.daemonology.net/bsdiff/, 2003.

(Continued)

*Primary Examiner* — Esther B Henderson
(74) *Attorney, Agent, or Firm* — Okamoto & Benedicto LLP

(57) ABSTRACT

A file or other data unit may be scanned for malicious code by calculating a hash value of a portion of the file or data unit and transmitting the hash value of the portion over a computer network to a remotely located server computer. In the server computer, the hash value of the portion may be compared to hash values of malicious codes. The server computer may send the result of the comparison over the computer network to the client computer. The client computer may send one or more additional hash values of other portions of the file or data unit when the result indicates that the hash value of the portion matches a hash value of malicious code. Otherwise, the client computer may deem the file or data unit to be free of malicious code.

20 Claims, 5 Drawing Sheets

(56) References Cited

U.S. PATENT DOCUMENTS

| | | | |
|---|---|---|---|
| 2007/0101146 | A1 | 5/2007 | Louch et al. |
| 2007/0150948 | A1 | 6/2007 | De Spiegeller |
| 2007/0162463 | A1 | 7/2007 | Kester et al. |
| 2007/0174909 | A1 | 7/2007 | Burchett et al. |
| 2007/0234343 | A1 | 10/2007 | Gouge et al. |
| 2007/0240218 | A1 | 10/2007 | Tuvell et al. |
| 2007/0244920 | A1 | 10/2007 | Palliyil et al. |
| 2007/0250521 | A1* | 10/2007 | Kaminski ............... 707/101 |
| 2008/0033942 | A1 | 2/2008 | Kao et al. |
| 2008/0092235 | A1 | 4/2008 | Comlekoglu et al. |
| 2008/0095065 | A1 | 4/2008 | Albrecht |

OTHER PUBLICATIONS

Summary Cache: A Scalable Wide-Area Web Cache Sharing Protocol, 2 sheets [retrieved on May 21, 2008]. Retrieved from the Internet: http://pages.cs.wisc.edu/~cao/papers/summary-cache/share.html.

Bloom Filters—the math, 6 sheets [retrieved on May 22, 2008]. Retrieved from the Internet: http://pages.cs.wisc.edu/~cao/papers/summary-cache/node8.html.

Bloom Filter—Wikipedia, the free encyclopedia, 7 sheets [retrieved on May 21, 2008]. Retrieved from the internet: http://en.wikipedia.org/wiki/Bloom_filter.

John Wack, et. al., "Guide to Firewall Selection and Policy Recommendations", Oct. 2001, 64 pages, National Institute of Standards and Technology (NIST) special publication.

Microsoft TechNet "Unsolicited Commercial E-Mail Prevention and Filtering Performance Analysis", Jan. 1999, pp. 1-14, retrieved from the internet: http://www.microsoft.com/technet/archive/mcis/rkspmcpa.mspx?pf=true.

Martin Roesch, "Snort—Lightweight Intrusion Detection for Networks", 1999, pp. 229-238 of the 13th LISA Conference proceedings. Retrieved from the internet: http://www.usenix.org/events/lisa99/full_papers/roesch/roesch_html/.

* cited by examiner

INTERACTIVE MALICIOUS CODE DETECTION OVER A COMPUTER NETWORK

BACKGROUND OF THE INVENTION

1. Field of the Invention

The present invention relates generally to computer security, and more particularly but not exclusively to methods and apparatus for detecting malicious codes.

2. Description of the Background Art

Computer viruses, worms, Trojans, rootkits, and spyware are examples of malicious codes that have plagued computer systems throughout the world. Although there are technical differences between each type of malicious code, malicious codes are also collectively referred to as "viruses." Antivirus products for protecting computers against malicious codes are commercially available. Experienced computer users have installed some form of antivirus in their computers.

A typical antivirus includes a scan engine and a pattern file. The pattern file comprises patterns of known malicious codes. To check a file for malicious code, the scan engine opens the file and compares its content to patterns in the pattern file. While this pattern matching approach is relatively effective, the pattern file needs to be continually updated to address newly discovered malicious codes. As the number of known malicious codes increases, so does the size of the pattern file. The larger the pattern file, the more memory it uses.

SUMMARY

A file or other data unit may be scanned for malicious code by calculating a hash value of a portion of the file or data unit and transmitting the hash value of the portion over a computer network to a remotely located server computer. In the server computer, the hash value of the portion may be compared to hash values of malicious codes. The server computer may send the result of the comparison over the computer network to the client computer. The client computer may send one or more additional hash values of other portions of the file or data unit when the result indicates that the hash value of the portion matches a hash value of malicious code. Otherwise, the client computer may deem the file or data unit to be free of malicious code.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Being computer-related, it can be appreciated that some components disclosed herein may be implemented in hardware, software, or a combination of hardware and software (e.g., firmware). Software components may be in the form of computer-readable program code stored in a computer-readable storage medium, such as memory, mass storage device, or removable storage device. For example, a computer-readable storage medium may comprise computer-readable program code for performing the function of a particular component. Likewise, computer memory may be configured to include one or more components, which may be executed by a processor. Software components may be implemented in logic circuits, for example. Components may be implemented separately in multiple modules or together in a single module.

Embodiments of the present invention are described in the context of antivirus programs for illustration purposes only. In light of the present disclosure, those of ordinary skill in the art will appreciate that embodiments of the present invention may be generally employed in computer security and screening applications. For example, embodiments of the present invention may also be employed in anti-spam, data leakage prevention, and other computer security applications involving pattern matching. As a particular example, the hash value of a portion of a file discussed below may be that of a portion of an e-mail or data being transferred out of a network, while the hash values of malicious codes stored in a pattern database may be has values of known spam e-mail or data being protected against unauthorized transmission.

Figure 1:
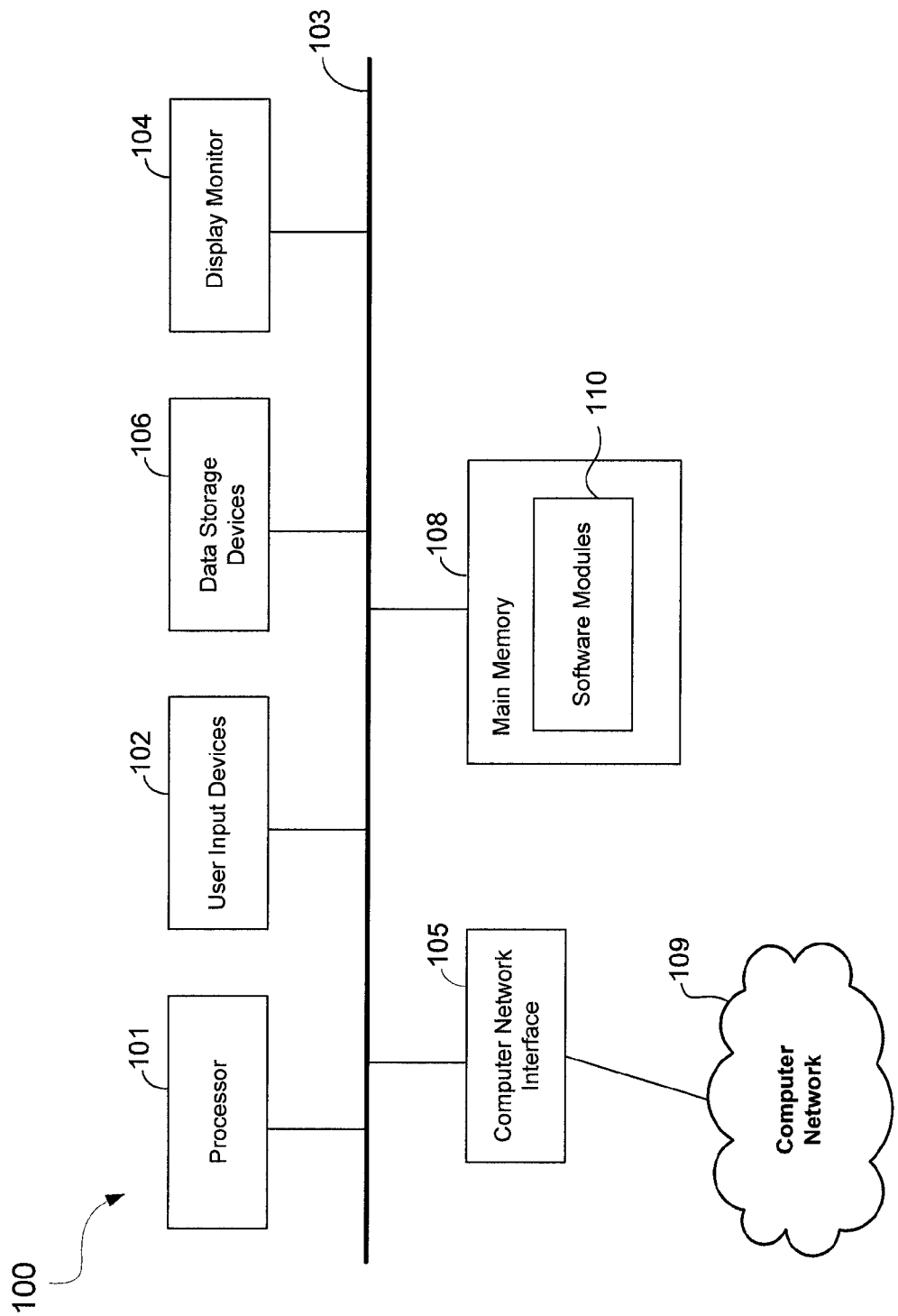
FIG. 1 shows a schematic diagram of a computer in accordance with an embodiment of the present invention.

Referring now to FIG. 1, there is shown a schematic diagram of a computer 100 in accordance with an embodiment of the present invention. Depending on its configuration, the computer 100 may be employed as a client computer (e.g., client computer 200 shown in FIG. 2) or a server computer (e.g., security server computer 210 shown in FIG. 2). The computer 100 may have less or more components to meet the needs of a particular application. The computer 100 may include a processor 101, such as those from the Intel Corporation or Advanced Micro Devices, for example. The computer 100 may have one or more buses 103 coupling its various components. The computer 100 may include one or more user input devices 102 (e.g., keyboard, mouse), one or more data storage devices 106 (e.g., hard drive, optical disk, USB memory), a display monitor 104 (e.g., LCD, flat panel monitor, CRT), a computer network interface 105 (e.g., network adapter, modem), and a main memory 108 (e.g., RAM). The computer network interface 105 may be coupled to a computer network 109, which in this example includes the Internet.

In the example of FIG. 1, the main memory 108 includes software modules 110. The software modules 110 may be loaded from the data storage device 106 to the main memory 108 for execution by the processor 101. The software modules 110 may comprise software components of the client computer 200 or security server computer 210 of FIG. 2.

Figure 2:
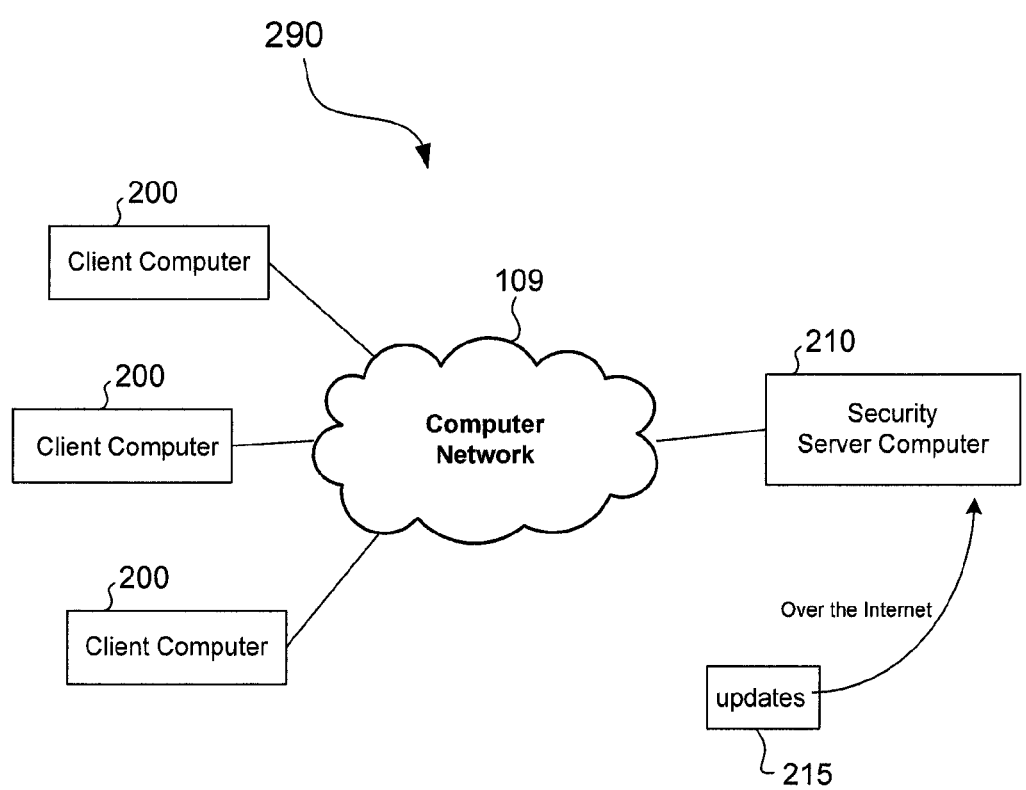
FIG. 2 shows an interactive malicious code detection system in accordance with an embodiment of the present invention.

FIG. 2 shows an interactive malicious code detection system 290 in accordance with an embodiment of the present invention. In the example of FIG. 2, the system 290 includes one or more client computers 200 and a security server computer 210. There may be more than one security server computer 210 in any given installation but only one is shown in FIG. 2 for clarity of illustration. The computers 200 and 210 may communicate over the computer network 109, which may include the Internet. Preferably, the computers 200 and 210 are part of a private computer network, with the security server computer 210 receiving updates 215 over the Internet. The updates 215 may comprise updates to a pattern database 214 (see FIGS. 3 and 4) and other antivirus components of the security server computer 210.

Figure 3:
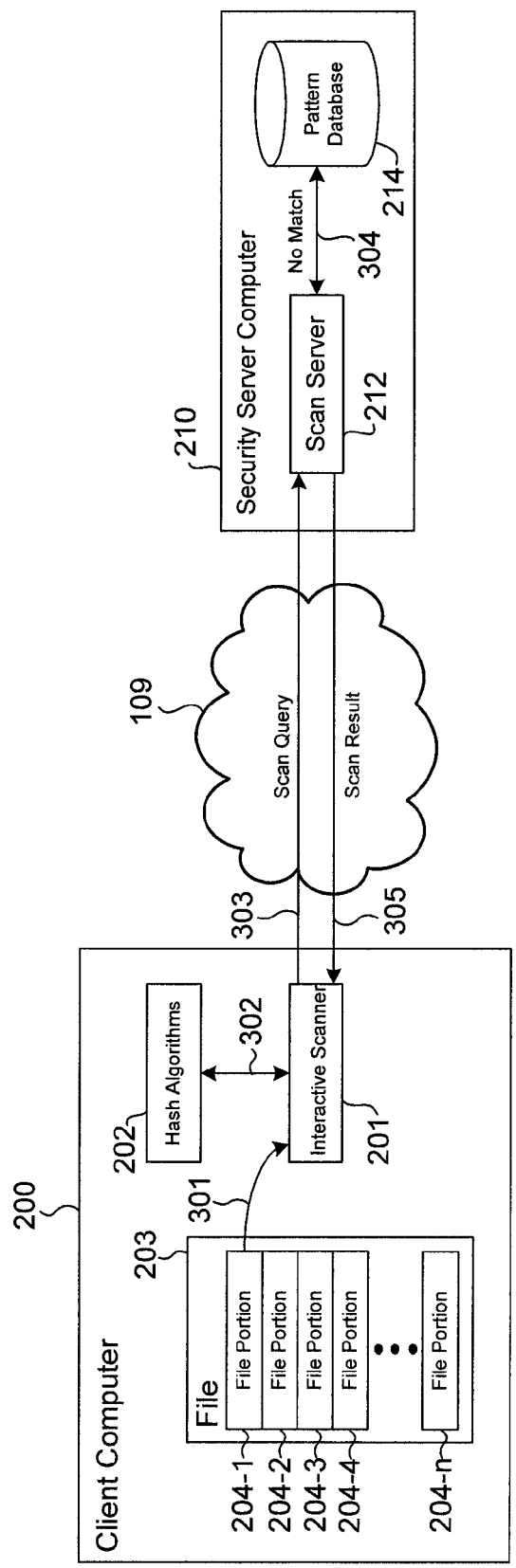
FIG. 3 schematically illustrates an example operation in a case where the file being scanned is clean, in accordance with an embodiment of the present invention.
Figure 4:
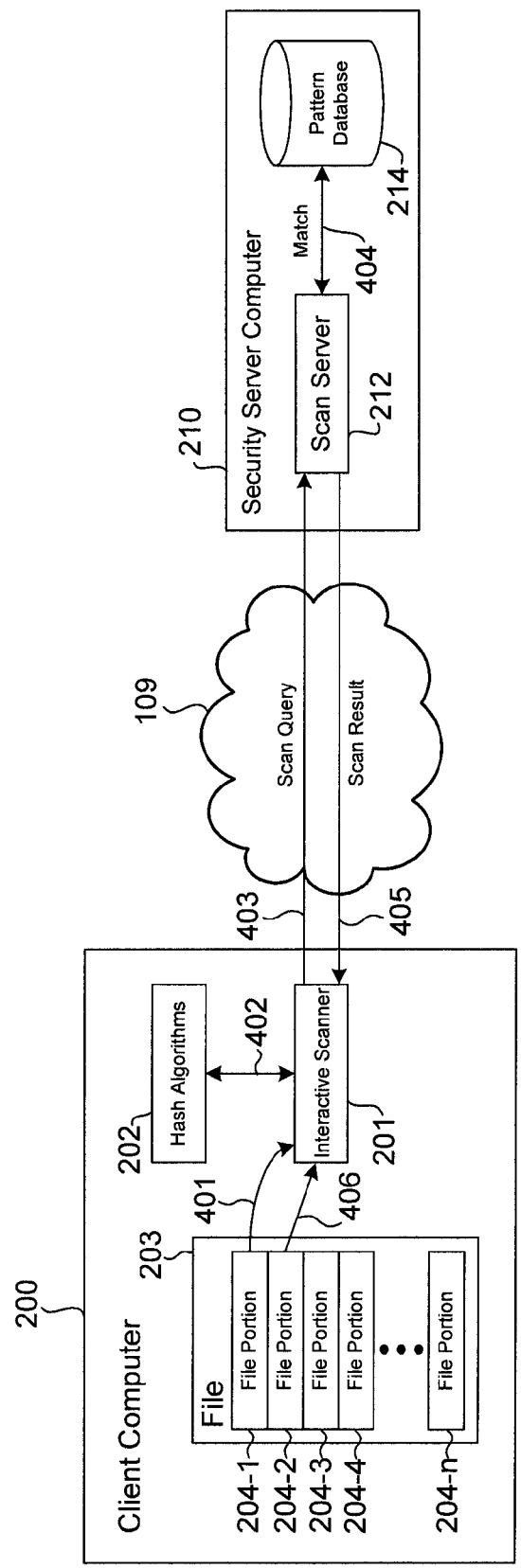
FIG. 4 schematically illustrates an example operation in a case where the file being scanned is infected, in accordance with an embodiment of the present invention.

FIGS. 3 and 4 schematically illustrate the operation of the system 290 in accordance with an embodiment of the present invention. In the example of FIGS. 3 and 4, a client computer 200 comprises an interactive scanner 201 and hash algorithms 202, while the security server computer 210 comprises a scan server 212 and a pattern database 214.

The interactive scanner 201 may comprise computer-readable program code for scanning a file 203 (or other data units) for malicious codes. In one embodiment, the interactive scanner 201 is configured to treat the file 203 as comprising several portions 204 (i.e., 204-1, 204-2, 204-3, 29404, ..., 204-n), calculate a hash value for a single portion 204 using the hash algorithms 202, and determine if the file 203 is infected with malicious codes by comparing a hash value of the portion 204 against hash values of malicious codes. Note that portions 204 may be overlapping. As an example, the portion 204-1 may have contents included in the portion 204-2. If the hash value of the particular portion 204 does not match a hash value of a malicious code, the interactive scanner 201 may deem the file to be clean, i.e., free of malicious code. Otherwise, the interactive scanner may repeat the process of calculating a hash value and comparing the hash value with those of malicious codes for a different portion 204 until a portion 204 having a hash value that does not match a hash value of malicious code is found, in which case the file 203 is deemed clean, or a certain number or all portions 204 are found to have hash values matching those of a malicious code, in which case the file 203 is deemed infected, i.e., containing or generated by malicious code.

The interactive scanner 201 may determine if a portion 204 has a hash value matching that of a malicious code by querying the security server computer 210 over the computer network 109. This form of scanning is also referred to as scanning "in the cloud." In one embodiment, the interactive scanner 201 is configured to send a hash value of a portion 204 to the security server computer 210, where the scan server 212 compares the hash value to those in the pattern database 214. The scan server 212 sends the result of the hash value comparison to the interactive scanner 201 over the computer network 109. If the result indicates that there is a "match," i.e., the hash value matches that of one or more malicious codes, the interactive scanner 201 calculates and sends a hash value of another portion 204 to the security server computer 210. Otherwise, the interactive scanner 201 deems the file 203 to be clean and ends the scanning process.

The hash algorithms 202 may comprise algorithms for calculating a hash value. In one embodiment, the hash algorithms 202 comprise algorithms for calculating a cyclic redundancy check (CRC) value. The hash algorithms 202 may include a hash algorithm for generating a hash for identifying particular malicious codes, a hash algorithm for generating a hash for identifying known clean files, and so on. Each hash algorithm in the hash algorithms 202 may use the same hash algorithm but perform the hash on different portions of the file. Algorithms for calculating hash values other than CRC may also be used without detracting from the merits of the present invention.

The scan server 212 may comprise computer-readable program code for determining if a portion 204 of a file 203 (or other data unit) matches at least a portion of malicious code. In one embodiment, the scan server 212 is configured to service scan queries sent by the interactive scanner 201. A scan query may comprise a hash of a portion 204 of a file 203 and other information relating to the portion 204, the file 203, and/or the interactive scanner 201. For example, the other information may comprise authentication code to ensure that the scan query is from an authorized, subscribing interactive scanner 201. The scan server 212 may be configured to match the hash value of the portion 204 to hash values of malicious codes having an entry in the pattern database 214. The scan server 212 may be configured to send a scan result in response to the scan query. The scan result may indicate whether or not the portion 204 matches at least a portion of malicious code. In one embodiment, the scan result indicates whether or not the hash value of the portion 204 matches a hash value of one or more malicious codes stored in the pattern database 214.

The pattern database 214 may comprise patterns (e.g., in the form of hash values) of malicious codes. In one embodiment, the pattern database 214 includes hash values of malicious codes and other information for detecting malicious codes. The pattern database 214 may also have hash values for identifying clean files. The hash values stored in the pattern database 214 and the hash values calculated using the hash algorithms 202 may comprise CRC values, for example.

By using a remote security server computer 210 to scan a file 203 for malicious codes, the interactive scanner 201 does not necessarily require a local pattern file. This advantageously reduces the computing and memory load imposed by antivirus operations on the client computer 200. The client computer 200 also does not necessarily require periodic pattern file updates. This becomes more important as cyber criminals (e.g., virus coders, hackers) unleash different and evolving malicious codes that require ever increasing pattern files to be stored and processed in the end-point computer, i.e., the computer being protected against malicious codes, which is the client computer 200 in this example. As can be appreciated, the remote security server computer 210 can be dedicated for computer security operations, and can thus be configured to be more powerful than a client computer 200. To save cost, a single remote security server computer 210 can be configured to service a plurality of client computers 200 as in FIG. 2.

By extracting and calculating a hash value for a portion 204, rather than entirety, of the file 203 at a time, the interactive scanner 201 reduces the time to calculate and the memory requirement to store the hash value. This also reduces the size of the scan query sent to the security server computer 210 over the network 109, reducing scanning latency. When a file 203 is clean, it would take as little as a single portion 204 (e.g. a 4 KB portion of the file) to scan the file 203 and determine that it is clean. Since most files 203 are clean, the savings in network bandwidth and computing resources are considerable. Embodiments of the present invention thus remove a bottleneck in conventional antivirus operations by reducing or completely eliminating the need for a local pattern file, without substantially increasing scanning latency and network traffic.

FIG. 3 schematically illustrates an example operation in the case where the file 203 is clean. To scan the file 203 for malicious codes, the interactive scanner 201 extracts the portion 204-1 of the file 203 (arrow 301) and then calculates a hash value of the portion 204-1 using a hash algorithm 202 (arrow 302). The interactive scanner 201 composes a scan query for the portion 204-1 and sends the scan query to the remotely located security server computer 210 over the network 109 (arrow 303). The scan query may include the hash value of the portion 204-1.

In the security server computer 210, the scan server 212 receives the scan query and extracts the hash value of the portion 204-1 therefrom. The scan server 212 checks the hash value of the portion 204-1 against hash values of malicious codes stored in the pattern database 214 (arrow 304). In this example, the hash value of the portion 204-1 does not match any hash value of malicious codes in the pattern database 214. Accordingly, the scan server 212 prepares a scan result indicating that there is no match, and sends the scan result to the client computer 200 over the network 109 (arrow 305). In the client computer 200, the interactive scanner 201 receives and analyzes the scan result. Because the scan result indicates that the hash value of the portion 204-1 does not match any of the hash values of malicious codes, the interactive scanner 201 deems the file 203 to be clean.

FIG. 4 schematically illustrates an example operation in the case where the file 203 is infected. As before, the interactive scanner 201 extracts the portion 204-1 (arrow 401) and calculates a hash value of the portion 204-1 using a hash algorithm 202 (arrow 402). The interactive scanner 201 composes a scan query for the portion 204-1 and sends the scan query to the remotely located security server computer 210 over the network 109 (arrow 403). The scan query may include the hash value of the portion 204-1.

In the security server computer 210, the scan server 212 receives the scan query and extracts the hash value of the portion 204-1 therefrom. The scan server 212 checks the hash value of the portion 204-1 against hash values of malicious codes stored in the pattern database 214 (arrow 404). In this example, the hash value of the portion 204-1 matches at least one hash value in the pattern database 214. This indicates that the file 203 is possibly infected. The scan server 212 prepares a scan result indicating that there is a match, and sends the scan result to the client computer 200 over the network 109 (arrow 405).

In the client computer 200, the interactive scanner 201 receives and analyzes the scan result. Because the scan result indicates that the hash value of the portion 204-1 matches a hash value of one or more malicious codes, the interactive scanner 201 finds that the file 203 is possibly infected. However, because the portion 204-1 represents a relatively small portion of the file 203, the interactive scanner 201 still cannot deem the file 203 to be infected at this time. Preferably, a predetermined number of portions 204 has to be tested positive (i.e. having matching hash values of malicious codes in the pattern database 214) before the interactive scanner 201 deems the file 203 to be infected. Accordingly, the in the cloud scanning process is repeated for another portion 204, which in this example involves extracting the portion 204-2 (arrow 406), calculating the hash value of the portion 204-2, providing the hash value of the portion 204-2 to the security server computer 210 over the network 109, checking the hash value of the portion 204-2 against hash values of malicious codes in the pattern database 214, and receiving and analyzing the result in the client computer 200. The in the cloud scanning process may be repeated for different portions 204 until a portion 204 with no matching hash value is found (i.e., the file 203 is clean) or a predetermined number of portions 204 is found to have a match (i.e., the file 203 is infected).

Instead of sending a single hash value for the portion 204-1 to the security server computer 210, the interactive scanner 201 may include two or more hash values of the portion 204-1 or other portion 204 in the scan query. The additional hash values may be for identifying known clean files, particular malicious codes and the like. In any case, the procedure for calculating the hash values in the client computer 200 and comparing the hash values in the security server computer 210 are similar. As a particular example, the interactive scanner 201 may extract a portion 204 and calculate its hash value using a hash algorithm for identifying known clean files. The interactive scanner 201 may send that hash along with the hash for identifying malicious codes to the security server computer 210, where the hash for identifying known clean files is compared to hashes of known clean files in the pattern database 214. If the hash of the portion 202 for identifying known clean files matches a hash of known clean files in the pattern database 214, the scan server 212 so informs the interactive scanner 201, which deems the file 203 to be clean.

Hash values of portions 204 that are deemed to be clean may be cached or maintained in a white list. The white list may be maintained in and consulted by the client computer 200 prior to sending a scan query to the security server computer 210. This advantageously conserves network bandwidth consumption. For added security, the security server computer 210 may send a notice to the client computer 200 to reset the white list or cache whenever the pattern database 214 is updated.

Figure 5:
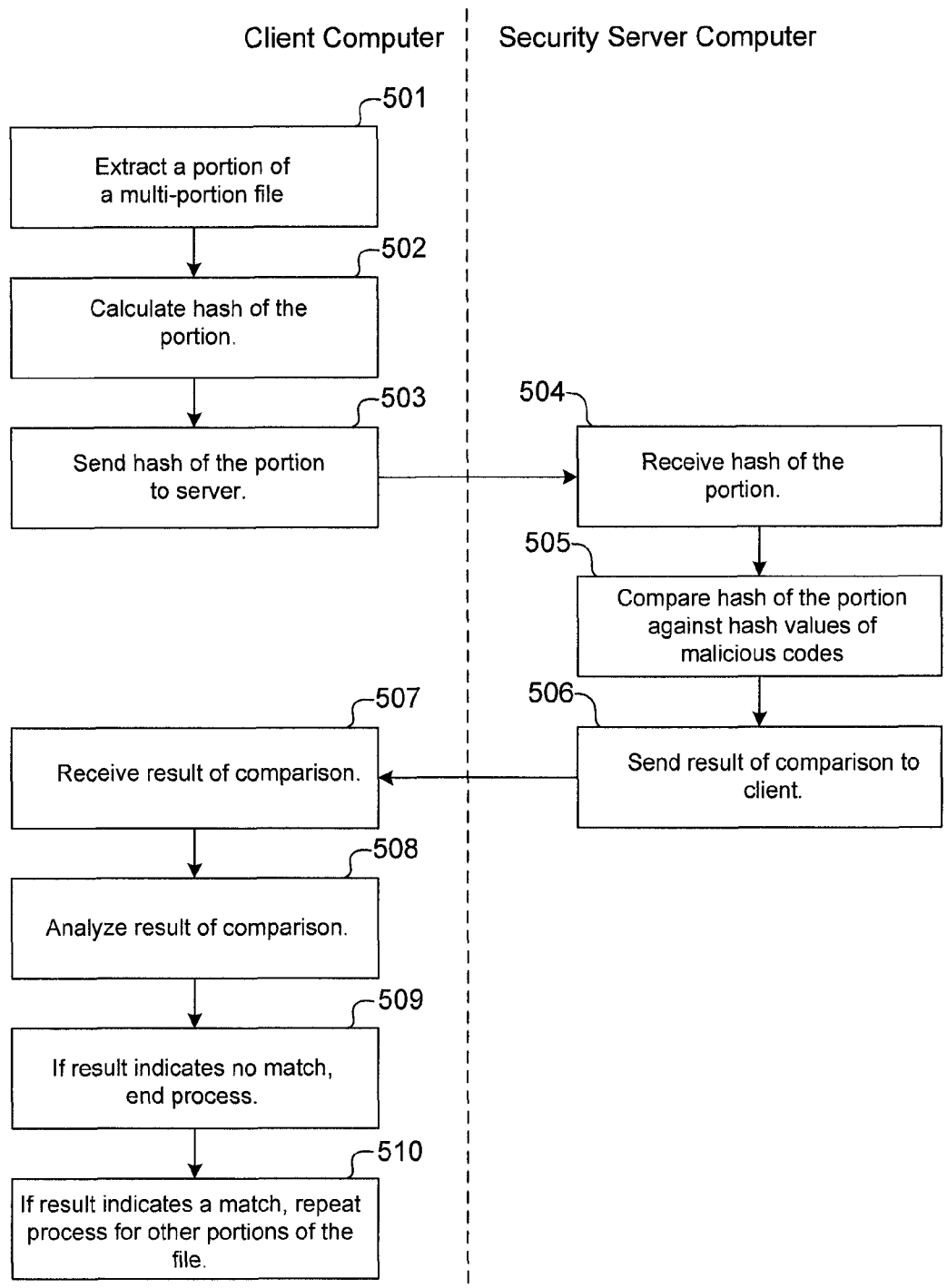
FIG. 5 schematically shows a call diagram of detecting malicious code in a file or other data units in accordance with an embodiment of the present invention.

FIG. 5 schematically shows a call diagram of detecting malicious code in a file or other data units in accordance with an embodiment of the present invention. In the example of FIG. 5, steps on the left hand side are performed in a client computer, while steps on the right hand side are performed in a remotely located security server computer. The client computer and the security server computer may communicate over a computer network.

In the client computer, a portion of a file that comprises several portions are extracted (step 501). A hash value of the portion is calculated using a hash algorithm (step 502). The hash value of the portion is sent to the remotely located security server computer over a computer network (step 503). The client computer may consult a cache or white list of clean hash values before sending the hash value to the security server computer. The hash value of the portion is received in the security server computer (step 504), where the hash value is compared against hash values of malicious code (step 505). The result of the hash value comparison is forwarded to the client computer over the computer network (step 506). The result of the hash value comparison is received (step 507) and analyzed (step 508) in the client computer. If the result indicates that the hash value of the portion does not match a hash value of malicious codes, the file is deemed clean and the scanning process ends (step 509). Otherwise, if the result indicates that the hash value of the portion matches a hash value of one or more malicious codes, the file is deemed possibly infected. In that case, the scanning process is repeated using other portions of the file to verify (step 510).

Systems and methods for detecting malicious codes have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method of detecting malicious code, the method to be performed by a client computer and comprising:

extracting a first portion of a file that has a plurality of portions;

calculating a hash value of the first portion;

transmitting the hash value of the first portion over a computer network to receive a result indicating whether or not the hash value of the first portion matches a hash value of malicious code;

receiving the result over the computer network; and calculating a hash value of a second portion of the file and transmitting the hash value of the second portion over the computer network to determine if the hash value of the second portion matches a hash value of malicious code when the result indicates that the hash value of the first portion matches a hash value of malicious code.

2. The method of claim 1 wherein the hash value of the first portion comprises a cyclic redundancy check (CRC) value.

3. The method of claim 1 wherein the hash value of the first portion and the hash value of the second portion are received in a same server computer over the computer network.

4. The method of claim 1 further comprising:

deeming the file to be free of malicious code when any one of the plurality of portions of the file has a hash value that does not match a hash value of malicious code.

5. The method of claim 1 further comprising:

calculating a hash value of a third portion of the file and transmitting the hash value of the third portion over the computer network to determine if the hash value of the third portion matches a hash value of malicious code when the hash values of the first and second portions match a hash value of malicious code.

6. The method of claim 5 further comprising:

deeming the file to be free of malicious code when the hash value of the third portion does not match a hash value of malicious code.

7. The method of claim 1 wherein the hash value of the first portion is received over the computer network by a server computer that compares the hash value of the first portion to hash values of malicious codes.

8. A malicious code detection system comprising:

a client computer configured to extract a single portion of a file that has a plurality of portions and send a scan query over a computer network to determine if the file is infected with malicious code based on the single portion, the client computer being further configured to send one or more additional scan queries over the computer network after receiving a scan result when the scan result indicates that the file is possibly infected with malicious code based on the single portion, the one or more additional scan queries containing information about one or more other portions of the file different from the single portion; and a server computer configured to receive the scan query and send the scan result responsive to the scan query to the client computer, the scan result indicating whether or not the file is possibly infected with malicious code based on the single portion of the file.

9. The system of claim 8 wherein the server computer comprises a pattern database containing hash values of malicious codes.

10. The system of claim 9 wherein the server computer is configured to compare a hash value of the single portion to the hash values of malicious codes in the pattern database.

11. The system of claim 9 wherein the scan query and the one or more additional scan queries include hash values compared by the server computer to the hash values of malicious codes in the pattern database.

12. The system of claim 8 wherein the scan query includes a hash value of the single portion.

13. The system of claim 12 wherein the hash value comprises a cyclic redundancy check (CRC) value.

14. The system of claim 8 wherein the client computer is configured to deem the file to be free of malicious code when the scan result indicates that the file is not possibly infected with malicious code.

15. A method of detecting malicious code, the method comprising:

treating a data unit as comprising a plurality of portions;

sending a first query containing information about a first portion in the plurality of portions over a computer network to determine if the data unit is infected with malicious code;

receiving a first result responsive to the first query; and sending a second query containing information about a second portion in the plurality of portions over the computer network when the first result indicates that the data unit is possibly infected with malicious code based on the first portion.

16. The method of claim 15 further comprising:

deeming the data unit to be free of malicious code when the second result indicates that the second portion has a hash value that does not match a hash value of one or more malicious codes.

17. The method of claim 15 wherein the first result indicates whether or not a hash value of the first portion matches a hash value of one or more malicious codes stored in a pattern database.

18. The method of claim 17 wherein the hash value comprises a cyclic redundancy check (CRC) value.

19. The method of claim 15 wherein the data unit comprises a file.

20. The method of claim 15 further comprising:

sending a third query containing information about a third portion in the plurality of portions over the computer network when the first result and a second result responsive to the second query indicate that data unit is possibly infected with malicious code based on the first and second portions.

* * * * *